United States Patent [19]

Bradbury

[11] Patent Number: 4,787,546
[45] Date of Patent: Nov. 29, 1988

[54] APPARATUS FOR AUTOMATIC THREADING OF A WEB

[75] Inventor: Philip F. Bradbury, Topsfield, Mass.

[73] Assignee: General Scanning, Inc., Watertown, Mass.

[21] Appl. No.: 837,544

[22] Filed: Mar. 7, 1986

[51] Int. Cl.[4] .................... G03B 1/56; G01D 15/28
[52] U.S. Cl. ............................. 226/91; 400/613.1; 346/145
[58] Field of Search .................. 226/91, 92, 198, 196; 242/67.2, 195; 346/136, 145; 400/613.1, 617, 600.4, 595, 642, 43, 120, 645, 645.3, 645.4, 647

[56] References Cited

U.S. PATENT DOCUMENTS

| | | | |
|---|---|---|---|
| 2,587,517 | 2/1952 | Paxson | 242/78 |
| 2,829,844 | 4/1958 | Larson | 242/74.2 |
| 3,082,970 | 3/1963 | Rasmussen | 242/55.53 |
| 3,245,632 | 4/1966 | Hicks | 242/74.1 |
| 3,369,249 | 2/1968 | Argy et al. | 346/33 |
| 4,050,079 | 9/1977 | Pegnim | 346/145 |
| 4,072,280 | 2/1978 | Lewis | 242/195 |
| 4,377,813 | 3/1983 | Grossman et al. | 346/33 |
| 4,396,926 | 8/1983 | Manning et al. | 346/136 X |
| 4,560,995 | 12/1985 | Suga et al. | 346/136 |
| 4,693,621 | 9/1987 | Kawaguchi | 400/636.1 |

FOREIGN PATENT DOCUMENTS 58-05283 1/1983 Japan .

387908 10/1973 U.S.S.R. ................ 226/91

Primary Examiner—Stuart S. Levy
Assistant Examiner—Steven M. DuBois

[57] ABSTRACT

A recorder or printer device including apparatus for threading a continuous web of printable material from a supply through a main drive nip, including a main drive nip formed by a drive surface of a rotatable roll and a main presser which urges the web against the roll, a loop-introducing guide surface arranged relative to the drive surface of the roll, to form a convergent channel leading to the drive nip, and an initial presser for urging the web against the roll at an initial drive nip spaced from the main drive nip. The initial presser has a second position separate from the drive roll for enabling placement of a leader portion of the web between the initial presser and the roll with the leader extending past the initial nip. In its nip position, the initial presser and the loop introducing guide surface are cooperatively constructed and arranged with respect to the roll in the manner that rotation of the roll causes retrograde motion of the leader to form a loop that is progressively guided toward the main nip until the main nip becomes effective to drive the web; and further rotation of the roll is effective to move the free end of the leader portion out from under the initial nip and through the main nip, the main nip thereafter, being effective to feed the web through the machine as a single layer.

9 Claims, 2 Drawing Sheets

APPARATUS FOR AUTOMATIC THREADING OF A WEB

BACKGROUND OF THE INVENTION

The invention relates to the automatic feeding of paper or other webbed material, from rolls or folded stacks into recorder or printer devices.

Paper rolls or folded stacks, referred to as "fans", are normally placed into a compartment in a machine such as a strip chart recorder and threaded over one or more rollers to align with a print head.

SUMMARY OF THE INVENTION

According to the invention, a recorder or printer device having means for threading a continuous web of printable material from a supply through a main drive nip, comprises a main drive nip formed by a drive surface of a rotatable roll, and a main presser which urges the web against the roll, a loop-introducing guide surface arranged relative to the drive surface of the roll, to form a convergent channel leading to the drive nip, and an initial presser for urging the web against the roll at an initial drive nip spaced from the main drive nip, the initial presser having a second position, separate from the drive roll, for enabling placement of a leader portion of the web between the initial presser and the roll, with the leader extending past the initial nip further, the initial presser, in its nip position, and the loop introducing guide surface being cooperatively constructed and arranged with respect to the roll in the manner that rotation of the roll causes retrograde motion of the leader to form a loop that is progressively guided toward the main nip until the main nip becomes effective to drive the web, further rotation of the roll being effective to move the free end of the leader portion out from under the initial nip and through the main nip, thereafter, the main nip being effective to feed the web through the machine as a single layer.

In preferred embodiments, the initial guide surface is defined by a spring member carried by a door, in its open position the door providing an access to the supply space of the machine to enable replenishment of the supply, in its closed position the door positions the spring member to press resiliently against the roll; the member defining the initial presser, in its nip-defining position, extends to the entry of the converging channel defined between the loop-introducing guide surface and the roll, thereby to deliver the forming loop to the converging channel; the main presser is defined by a downstream portion of the loop-introducing guide surface; the printing head is disposed in a position downstream of and adjacent to the main presser to provide printing on the web as the web moves forward on said roll; and the machine is a chart recorder, preferably adapted to produce an electrocardiogram.

According to another aspect, an apparatus for use with a recorder, printer or the like for threading a continuous web of material through a drive nip comprises a rotatable drive roller having a drive surface, a guide means having a guide surface opposed to the drive surface and defining with the drive surface a converging nip, the guide surface, at a position spaced from an entry to the nip, being disposed relative to the drive surface in a manner to press the web against the surface to cause the web to be urged forward by movement of the drive surface, and a threading member in a first position being sized and adapted to extend into the entry to the nip in a manner to urge the web into the nip, having a threading surface disposed relative to the drive surface in a manner to press the web against the drive surface to cause the web to be urged forward by movement of the drive surface, toward the convering nip, and the threading member having a second position, spaced from contact of the threading surface with the drive surface.

In preferred embodiments, the threading member comprises a spring member carried by a door, the door in a closed position disposing the spring member in a position extending into the entry to the nip, with the threading surface at least closely adjacent the drive surface of the roller, and in an open position removing the spring member from the nip.

The invention thus features an apparatus for self-threading chart paper pulled from a supply, that is suited for use with recorders, e.g., strip chart recorders such as those used for electrocardiograms, and, indeed, for paper or web material feeds generally.

Other features, and advantages of the invention will be understood from the following description of the presently preferred embodiments, and from the claims.

DESCRIPTION OF THE PREFERRED EMBODIMENTS

The drawings will first be described briefly.

Drawings

Figure 1:
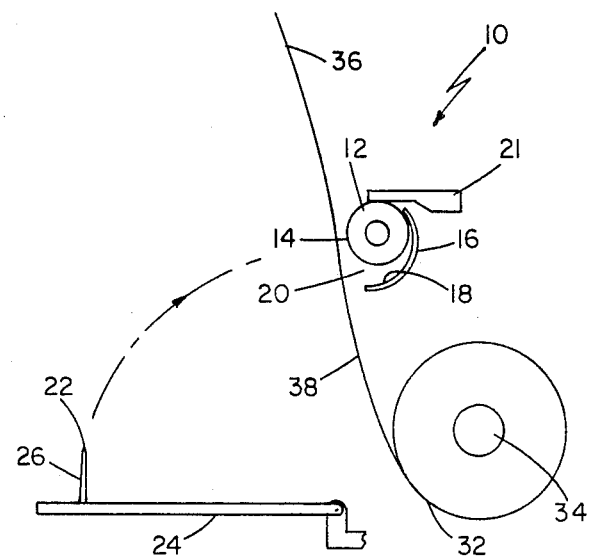
Figure 1A:
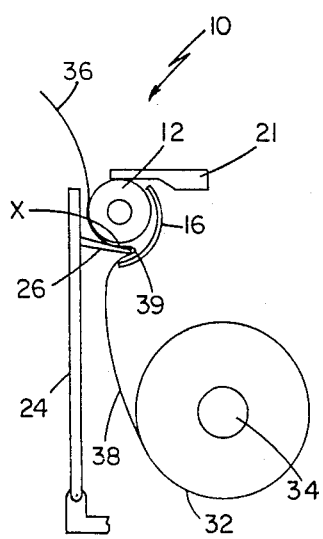
Figure 1B:
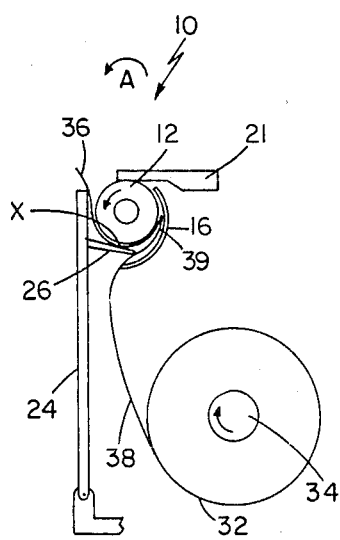
Figure 1C:
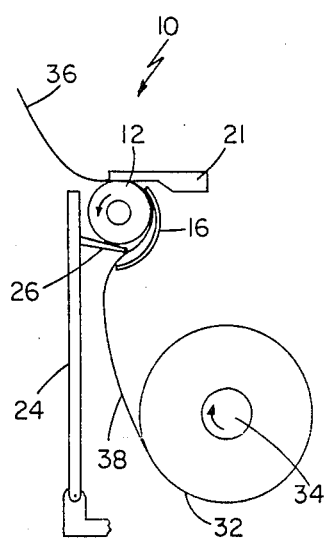
Figure 2:
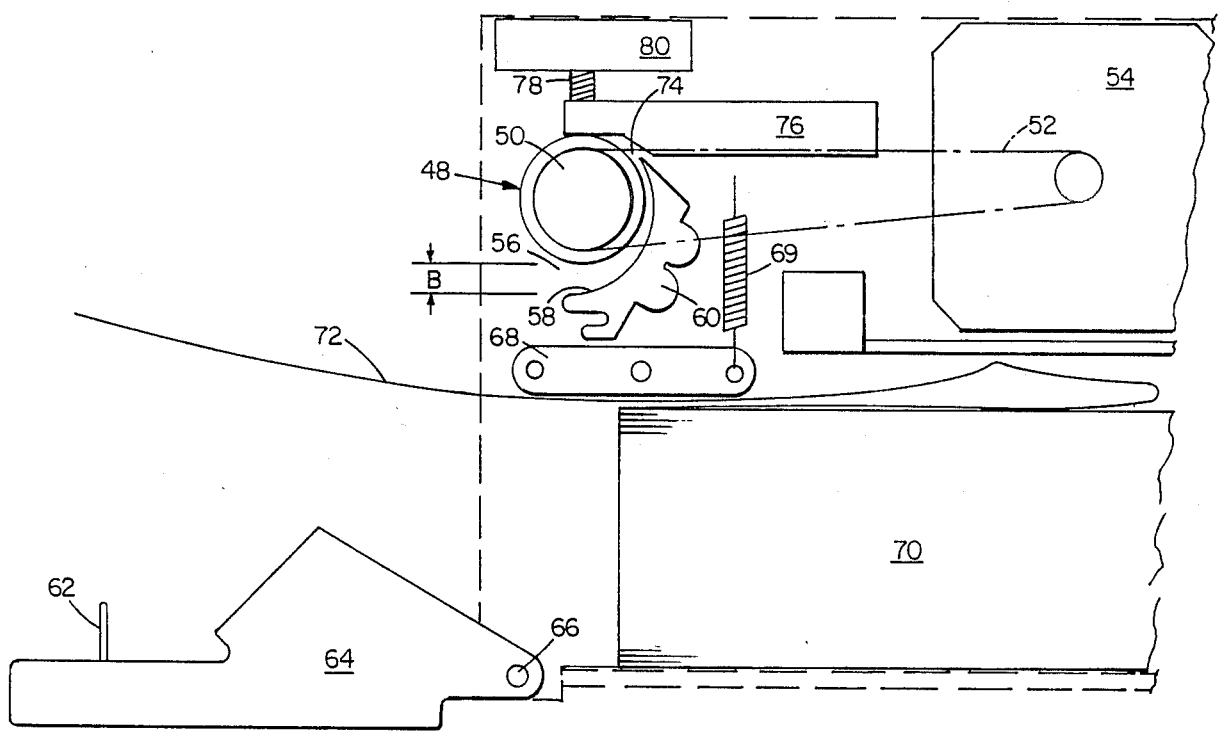
Figure 2A:
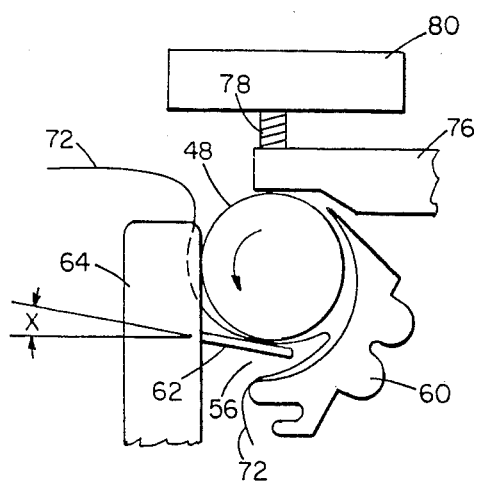
Figure 2B:
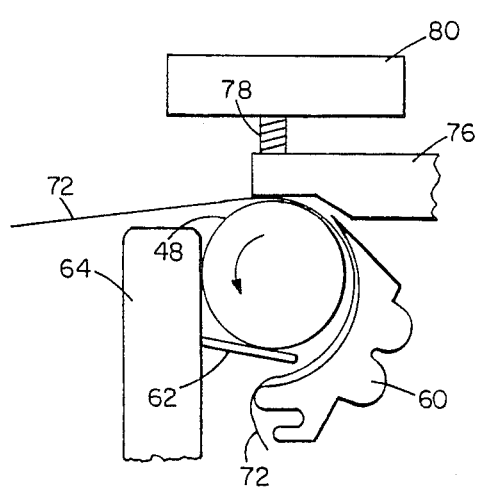

FIGS. 1 through 1c are somewhat diagrammatic representations of the apparatus of invention showing operation of the apparatus sequentially; and FIG. 2 is a somewhat diagrammatic representation of one embodiment of the invention, while FIGS. 2a and 2b are similar views of the apparatus, enlarged to show in detail the sequence of operation of the apparatus.

Structure

Referring to FIG. 1, and also to FIGS. 1a–1c, the apparatus 10 of the invention consists of a rotatable drive roller 12 having a drive surface 14, a paper guide 16 defining a loop-introducing guide surface 18 opposed to the drive surface 14 and, with surface 14, forming a converging nip 20, and a resilient threading member 22 affixed to door 24, and having a first position spaced from the nip 20, shown in FIG. 1, and a second position extending into the nip, with a threading or initial presser surface 26 of the threading member at least closely adjacent the drive surface 14 in a manner to press the web against the drive surface, as shown in FIGS. 1a–1c. In the embodiment shown, the apparatus is a printer or recorder 10, having a print medium 21.

To thread printer or recorder 10 employing the apparatus of the invention, a supply of paper is loaded, e.g. in FIG. 1, roll 32 is loaded on shaft 34. With door 24 in the open position, and threading member 22 removed from nip 20, a leader of predetermined minimum length is pulled from the paper web supply roll by drawing end 36 between the drive roller and the door. Door 24 is then closed, causing threading member 22 to engage the surface 38 of the paper web, urging it in a loop 39 into the nip, with the threading surface 26 of member 22 pressing the web against the surface of the drive roller at X to form an initial nip. As the drive roller rotates in the direction of arrow A, the pressure of threading member against the web onto the drive surface causes the free leader end of the web, downstream of the initial nip to be drawn toward the initial nip at X, and urged forward into the converging nip, as shown in FIG. 1a. As the paper web is urged into the converging nip, a point is reached, shown in FIG. 1b, where the leading portion of the web loop is engaged in the main nip between the opposed surfaces of the guide and of the drive roller, to be urged forward by the pressing contact of the guide surface on the web onto the roller. Continuing rotation of the drive roller draws the free leader end of the web about the roller, in direction A, disengaging it from the initial nip of threading member 12 and drawing it through the main nip and out beneath print medium 21. At this point, shown in FIG. 1c, the paper web is of single thickness, and printer or recorder is threaded and ready for normal operation.

Referring to FIGS. 2-2c, a particular embodiment of the invention is shown in detail. The drive surface 48 of roller 50, driven by belt 52 from motor 54, forms a converging nip 56 with the guide surface 58 of guide 60. Resilient threading member 62, formed of a thin, e.g. about 0.05 cm, metal or plastic spring, or foam, is affixed to door 64, which pivots about hinge pin 66 from a first open position with the threading member 62 spaced from nip 56, shown in FIG. 2, to a second closed position, held by latch 68 and spring 69, with the threading member extending into the nip.

The printer is threaded in the manner described above with respect to FIGS. 1-1c. The source of web is fan fold 70. The top fold 72, and connected folds, are pulled out beneath door latch 68 and the end of the web remains outside of the machine. As the door is closed, flexible spring member 62 contacts the face of web 72 and pushes it into the initial drive nip between drive surface 48 and main presser 60. The drive surface 48 and main Presser 60 are Positioned such that the greatest distance between the facing edges of drive surface 48 and main presser 60 is distance B, approximately 0.5 cm, such that paper web 72, when folded into a loop, will engage surface 48 and enter initial nip 56. The closest distance between the facing edges of drive surface 48 and main presser 60 is a distance just greater than the thickness of web 72, approximately 0.2 mm, such that web 72 can pass through nip 74 and engage surface 48. Spring 62 is positioned such that it lies at angle x to the horizontal, approximately 15°. In this position spring 62 applies light pressure to surface 48 such that web 72 is pushed against surface 48. When motor 54 is activated, and thence roller 48 moves as shown in FIG. 2a and b, the fold in web 72 is urged, as described above, between surface 48 and main presser 60. When threading is complete, web 72 passes between surface 48 and print head 76. Print can now be applied to paper web 72, dependent upon pressure from pressure spring 78, controlled by electronic means 80.

Other embodiments are within the following claims:

1. A recorder or printer apparatus having means for threading a continuous web of printable material from a supply through a main drive nip, said device comprising:
    a main drive nip formed by a drive surface of a rotatable roll and a main presser which urges the web against the roll,
    a loop-introducing guide surface arranged relative to the drive surface of said roll, to form a convergent channel leading to said drive nip, and
    an initial presser for urging the web against the roll at an initial drive nip spaced from said main drive nip, said initial presser having a second position separate from said drive roll for enabling placement of a leader portion of said web between said initial presser and said roll with the leader extending past said initial nip,
    the initial presser in its nip position and said loop introducing guide surface being cooperatively constructed and arranged with respect to said roll in the manner that rotation of said roll causes retrograde motion of said leader to form a loop that is progressively guided toward said main nip until said main nip becomes effective to drive the web, further rotation of said roll being effective to move the free end of said leader portion out from under said initial nip and through the main nip, thereafter, the main nip being effective to feed the web through said machine as a single layer.

2. The apparatus of claim 1 wherein said initial guide surface is defined by a spring member carried by a door, in its open position said door providing access to the supply space of said machine to enable replenishment of said supply, in its closed position said door positioning said spring member to press resiliently against said roll.

3. The apparatus of claim 1 or 2 wherein the member defining said initial presser, in its nip-defining position, extends to the entry of the converging channel defined between said loop-introducing guide surface and said roll, thereby to deliver the forming loop to said converging channel.

4. The apparatus of claim 1 or 2 wherein said main presser is defined by a downstream portion of said loop-introducing guide surface.

5. The apparatus of claims 1 or 2 wherein a printing head is disposed in a position downstream of and adjacent to said main presser to provide printing on said web as the web moves forward on said roll.

6. The apparatus of claim 1 wherein said recorder or printer apparatus is a chart recorder.

7. The apparatus of claim 1 wherein said web is a strip chart and said chart recorder comprises means to print an electrocardiogram.

8. Apparatus for use with a recorder, printer or the like for threading a continuous web of material through a drive nip, said apparatus comprising:
    a rotatable drive roller having a drive surface.
    a guide means having a guide surface opposed to said drive surface, said guide surface defining with said drive surface a converging nip, a segment of said guide surface, at a position spaced from an entry to said nip, disposed relative to said drive surface in a manner to press the web against said drive surface to cause said web to be urged forward by movement of the drive surface, and
    a threading member in a first position being sized and adapted to extend into said entry to said nip in a manner to urge said web into said nip, having a threading surface disposed relative to said drive surface in a manner to press the web against the drive surface to cause the web to be urged forward by movement of the drive surface, toward said converging nip, and
    said threading member having a second position, spaced from contact of said threading surface with said drive surface.

9. The apparatus of claim 8 wherein said threading member comprises a spring member carried by a door, said door in a closed position disposing said spring member in a position extending into the entry to said nip, with said threading surface at least closely adjacent the drive surface of the roller, and in an open position removing said spring member from said nip.

* * * * *